Oct. 15, 1957 W. A. YATES 2,810,070

AUTOMATIC ANTENNA TUNER

Filed June 18, 1954

Inventor
WILFRID A. YATES

By Wayne M. Hart
Attorney 2,810,070

AUTOMATIC ANTENNA TUNER

Wilfrid A. Yates, Silver Spring, Md., assignor to ACF Industries, Incorporated, New York, N. Y., a corporation of New Jersey Application June 18, 1954, Serial No. 437,824

8 Claims. (Cl. 250—17)

This invention relates to automatic tuning of an antenna, and has particular use in connection with highly reactive antennas.

For optimum operation, highly reactive antennas must be tuned. No difficulty is involved when the antenna is readily accessible, but in those applications where the antenna is remotely located and inaccessible, the tuning operation has to be performed automatically. Some equipment, for example a portable radio transmitter, by its nature is subjected to varying environmental conditions such as the terrain and weather. This equipment very definitely should tune its antenna, and to complicate the problem, it is assumed that such equipment is placed on land which is strange to the equipment, or in a body of water, depending on the specific nature of the radio transmitter. The present invention provides an assembly which cooperates with the antenna for automatically tuning the antenna in accordance with its necessities. Accordingly, an object of the invention is to provide a remotely operative antenna tuner which tunes its antenna in its environment by simple means and with speed and accuracy.

A more specific object of the invention is to provide an antenna with an adjustable impedance element such as a capacitor or inductor, in a resonant circuit and to adjust this element until it resonates with the circuit, at which time the adjusting of the element is stopped, and this is the point at which the antenna is tuned. In order to accomplish this, a special circuit is used, this circuit containing available parts and components, but arranged to function in a new way.

A further object of the invention is to provide a new circuit especially useful in tuning an antenna, the circuit having a tube which while conducting energizes an electro mechanical device, such as a solenoid or relay, the latter releasing an adjustable component operatively connected in a resonant circuit so that when resonance is attained this information is sensed and applied to the tube in the form of a bias to cut off, whereby the tube discontinues conducting, and the electro mechanical device is deenergized. This may be made to stop the adjusting movement of the component. If the device to be tuned is in the resonant circuit, the tuning thereof is accomplished.

The antenna tuner operates with great alacrity and accuracy, but the nature of the circuit is such that there will always be an extremely small increment of over tuning. It is so small that in most applications it will be best to ignore it. However, since the deviation from perfect tuning will always be in one direction, that is over tuning, a fixed increment trimmer component may be included in the resonant circuit. This will bring the automatic tuning to the point where further tuning would be prohibitive in view of the usual tolerances of the circuit components.

Other objects and features will become apparent in following the description of the illustrated embodiment of the invention, wherein—

Due to the simplicity of the present invention, it is useful in connection with expendable as well as permanent equipment. To explain the principles of the invention, reference is made herein to that type of transmitting equipment which may be used in stratosphere exploration, at sea or on land and left to broadcast radio signals.

Figure 1:
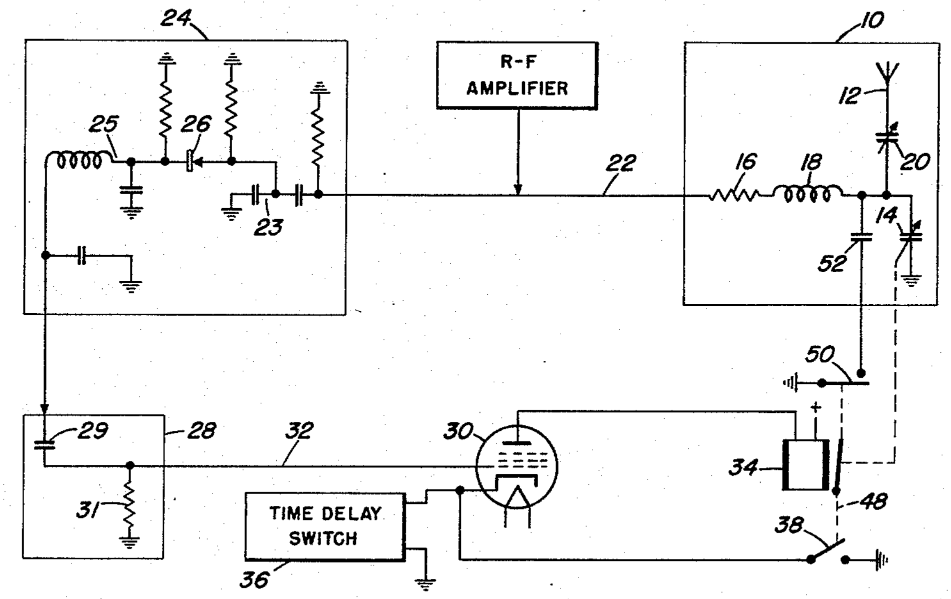
Figure 1 is a schematic diagram of one form of antenna tuner.
Figure 3:
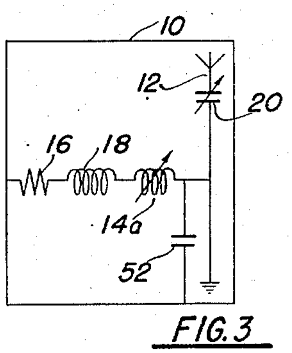
Figure 3 is a modification of the portion of Fig. 1 indicated by reference character 10.

Attention is invited first to Figure 1 where the antenna tuner circuit is diagrammatically illustrated. There is a resonant circuit 10 which includes an antenna 12, a variable impedance element or component 14 together with a ground resistance 16 and an inductor 18. The adjustable component 14 is a capacitor in this instance and therefore is in parallel with the antenna 12 whose capacitance is indicated at 20. The impedances of capacitor 14 and antenna 12 are connected in series with the resistor 16 and inductor 18. In the illustrated form of the invention the capacitance of the antenna 12 is selected for use in tuning the antenna. The inductance could have been selected, in which case as shown in Fig. 3 there would be a variable inductance 14*a* serially connected with inductor 18, and capacitor 14 is omitted.

Bus 22 connects the resonance circuit 10 with a detector circuit 24 and an R.-F. amplifier is applied to bus 22. The detector circuit includes a crystal detector 26 together with a voltage divider 23 and filter 25 which leads to an R–C differentiator circuit 28. A pentode 30 functioning as an amplifier is controlled by the differentiator circuit 28, having its grid connected thereto by means of bus 32. An electro mechanical device such as relay 34 is energized by current passing through tube 30 and the function of the relay is primarily to hold the adjustment of capacitor 14 at which the antenna is tuned.

In order to operate the circuit, an initiating pulse is applied to tube 30 by closing a switch, as time delay switch 36, thereby permitting the tube 30 to conduct and energize relay 34. When the relay is energized its armature moves causing a mechanical operation to be described subsequently, together with the closing of switch 38 which establishes a separate ground path with tube 30 and relay 34 in it.

Figure 2:
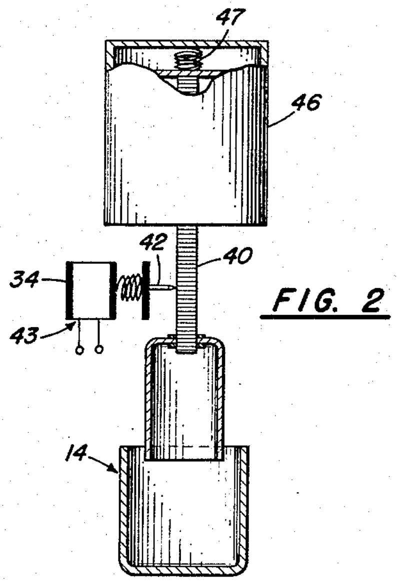
Figure 2 is a sectional view of the adjustable component and associated structure which is used in the circuit of Figure 1.

Figure 2 illustrates the variable tuning capacitor 14 to one part of which a shank 40 is connected. This shank is serrated, threaded or otherwise arranged to accept knife 42 which serves as part of a brake 43. The knife is fastened to relay 34 or an equivalent device. Shank 40 has one end connected in a dash pot 46 which may be either the liquid or air type.

In operation the equipment containing the antenna and tuner is placed in its new location, necessitating the antenna tuning. The switch 36 is closed when the pre-set timing mechanism therein dictates. This allows an initiating pulse to pass through tube 30 and relay 34. As a consequence, the knife 42, which is normally spring pressed against shank 40, is removed from engagement with the shank 40, allowing the shank to be lowered by gravity or by action of spring 47. In so doing the capacitor 14 moves through its range of adjustment. Meanwhile, a mechanical connection 48, as a linkage, between relay 34 and switch 38 closes the latter thereby establishing a separate ground path for tube 30 and relay 34. Accordingly, tube 30 continues to conduct and relay 34 remains energized, thereby holding the brake released from shank 40 which is secured to the movable part of capacitor 14.

Capacitor 14 being a part of resonant circuit 10 continues to move until such time that it is in resonance with the remainder of circuit 10. As the R.-F. voltage of circuit 10 builds up, during the movement of capacitor 14, the output of detector 26 follows, as does the filtered detector voltage at the detector side of the capacitor 29 in differentiator circuit 28. So long as the detector voltage is increasing, the grid of tube 30 offers a low impedance path so that the voltage across capacitor 29 follows the detector voltage. As capacitor 14 reaches and just begins to pass its resonant value, the detector voltage peaks and begins to drop. The grid impedance becomes very high as the bias voltage increases so the full drop of detector voltage appears at the tube grid for changes which are rapid compared to the time constant of the differentiator circuit (resistor 31 times capacitor 29). As soon as sufficient bias is developed at the tube grid, the tube no longer conducts. Then, relay 34 is no longer energized and the brake stops the adjustable capacitor, that is, knife 42 is spring returned into engagement with shank 40. This concludes the adjustment of capacitor 14, holding it in such an adjusted position that it is substantially in resonance with circuit 10.

The nature of detector circuit 24 and differentiator circuit 28 is such that the high bias voltage on bus 32 does not exist until a signal from detector circuit 24 has peaked and begins to fall. Therefore, there will be a very small error in the antenna tuning, but the error will be always overtuning rather than undertuning. Accordingly, a normally open switch 50 is mechanically connected to relay 34 so that when the relay 34 is actuated, switch 50 is closed. Connected to switch 50 is a capacitor 52 in parallel with capacitor 14. Capacitor 52 is therefore a trimmer of fixed value which reduces the error in the system to a point which is within the tolerances of the other components.

The drawing and description thereof involve, primarily, only one embodiment of the invention. It is a very simple form especially useful for a single use in a piece of expendable equipment, where speed and accuracy of antenna tuning is desired. With the described tuner, a highly reactive antenna may be tuned in about one second. However, refinements may be made in the basic system when desired. For example, it was previously indicated that instead of adjustable component 14, the adjustable impedance element may be an inductor in series with inductor 18. An advantage in doing this would be the elimination of the split of current at the antenna terminals. The relay 34 may be substituted by a solenoid, or a higher resolution brake may be used such as a band or a pin driven by a solenoid into holes in shank 40. Other variations that fall within the scope of the following claims may be made without departing from the invention.

What is claimed is:

1. In a circuit arrangement comprising an antenna having a variable tuning component movable in a single direction over a range of values to tune said antenna, a control system to tune said component to resonance, said control system comprising a relay acting upon energization to release said component for movement, a multi-electrode tube connected to said relay to energize the same, a voltage peaking differentiator circuit connected to the input of said tube and responsive to antenna circuit resonance to terminate tube conduction and deenergize said relay to stop motion of said component.

2. In a resonance circuit arrangement comprising an antenna having a variable tuning component movable in a single direction over a range of values to tune said antenna, a control system to tune said component, said control system comprising a detector circuit connected to said antenna and to the source of energy to be radiated, a differentiator circuit connected to said detector circuit to produce a signal proportional to the rate of change of detector voltage, a multi-electrode tube connected to receive said signal, and a relay connected to the output of said tube to stop motion of said component.

3. In a resonance circuit arrangement comprising an antenna for radiating high frequency energy and having a variable tuning component in a single direction over a range of values to tune said antenna, a control system to tune said component, said control system comprising a detector connected to said antenna and to the source of energy, an R–C differentiator circuit connected to said detector to produce a signal having an amplitude proportional to the rate of change of detector voltage, a multi-electrode tube connected to receive said signal at a control electrode thereof, and a relay connected to the output of said tube to terminate motion of said component and lock the same.

4. In a circuit arrangement comprising an antenna for radiating high frequency energy and having a variable tuning component movable in a single direction over a range of values to tune said antenna, a relay to release said component for motion, a detector circuit connected to said antenna and to the source of energy, an R–C differentiator circuit connected to said detector to produce a signal proportional to the rate of change of detector voltage, and a multi-electrode tube to receive said signal and having the output thereof connected to said relay whereby a peaking voltage from said differentiator cuts off tube conduction to deenergize said relay and terminate motion of said component to hold the same in final position.

5. The invention as set forth in claim 4 wherein said component is an adjustable condenser.

6. The invention as set forth in claim 4 wherein said component is an adjustable inductor.

7. The invention as set forth in claim 5 wherein said condenser comprises two telescoping elements, a spring normally urging said elements in interfitting relation, and a shaft intercommunicating between one said element and the said spring, the said relay including a member engageable with said shaft.

8. The invention as set forth in claim 5 including a switch connected to said relay, a trimmer condenser connected in parallel with said first mentioned condenser and in series with said switch whereby upon relay deenergization said switch closes to connect said trimmer condenser.

References Cited in the file of this patent

UNITED STATES PATENTS

| | | |
|---|---|---|
| 2,417,191 | Fox | Mar. 11, 1947 |
| 2,498,340 | Morrison | Feb. 21, 1950 |
| 2,609,490 | Hollywood | Sept. 2, 1952 |
| 2,679,581 | Jacob et al. | May 25, 1954 |